(12) United States Patent
Katsuramaki et al.

(10) Patent No.: US 9,701,261 B2
(45) Date of Patent: Jul. 11, 2017

(54) FLAT CABLE ROUTING STRUCTURE

(71) Applicant: Yazaki Corporation, Tokyo (JP)

(72) Inventors: Takahiko Katsuramaki, Susono (JP); Hikaru Sano, Susono (JP)

(73) Assignee: Yazaki Corporation, Tokyo (JP)

( * ) Notice: Subject to any disclaimer, the term of this patent is extended or adjusted under 35 U.S.C. 154(b) by 145 days.

(21) Appl. No.: 14/786,289

(22) PCT Filed: Apr. 21, 2014

(86) PCT No.: PCT/JP2014/061141
§ 371 (c)(1),
(2) Date: Oct. 22, 2015

(87) PCT Pub. No.: WO2014/175204
PCT Pub. Date: Oct. 30, 2014

(65) Prior Publication Data
US 2016/0059801 A1 Mar. 3, 2016

(30) Foreign Application Priority Data

Apr. 23, 2013 (JP) .................................. 2013-090056

(51) Int. Cl.
*B60R 16/02* (2006.01)
*H02G 11/00* (2006.01)
(Continued)

(52) U.S. Cl.
CPC ........ *B60R 16/0215* (2013.01); *B60R 16/027* (2013.01); *H02G 11/02* (2013.01)

(58) Field of Classification Search
CPC .... B60N 2/0732; B60N 2/06; B65H 2701/34; H01B 7/0045; H01B 7/18; H01B 7/08;
(Continued)

(56) References Cited

U.S. PATENT DOCUMENTS 3,300,572 A * 1/1967 Dahlgren ................. H01B 7/06
174/69
3,433,889 A * 3/1969 Devries, Jr. ............ H02G 11/00
174/541
(Continued)

FOREIGN PATENT DOCUMENTS

JP 2004-328985 A 11/2004

OTHER PUBLICATIONS

International Search Report mailed Jul. 22, 2014, issed for PCT/JP2014/061141.

*Primary Examiner* — Mark Le
(74) *Attorney, Agent, or Firm* — Locke Lord LLP

(57) ABSTRACT

A flat cable routing structure is provided for preventing flat cables from suffering damage or disconnection and minimizing winding device malfunction, even when the flat cables are used in a plurally stacked state. The flat cable routing structure is provided with: a winding device for winding one side end portion of plurally stacked flat cables as well as for feeding out the other side end portion of the flat cables, the winding device being disposed in the vicinity of a slide body; and a protector which is caused to slide between a proximal position proximal to the winding device at which the flat cables are wound and a distal position distal to the winding device at which the flat cables are fed out. The protector is provided with a slackness absorption part for absorbing, in the interior, a slack portion consisted of the inner/outer circumference lengths difference between the flat cable on the outside, and the flat cable on the inside, with respect to the direction in which the flat cables are stacked produced when the flat cables are wound by the winding device.

3 Claims, 5 Drawing Sheets

(51) Int. Cl.
*H02G 11/02* (2006.01)
*B60R 16/027* (2006.01)

(58) Field of Classification Search
CPC ...... H02G 11/00; H02G 11/006; H02G 11/02; B60R 16/00; B60R 16/02; B60R 16/027; B60R 16/0215; B60R 16/0207
USPC .......................................... 191/12 R, 12.2 R
See application file for complete search history.

(56) References Cited

U.S. PATENT DOCUMENTS

| | | | |
|---|---|---|---|
| 6,176,715 B1* | 1/2001 | Buescher | B60R 16/0207 439/162 |
| 7,425,143 B2* | 9/2008 | Mitsui | H01R 35/025 242/388 |
| 7,775,800 B2* | 8/2010 | Reischl | H01R 35/025 439/15 |
| 2001/0052442 A1* | 12/2001 | Tsukamoto | B60R 16/0215 191/12 R |
| 2002/0019150 A1* | 2/2002 | Kuki | B60R 16/027 439/11 |
| 2005/0133327 A1 | 6/2005 | Kao et al. | |
| 2011/0267798 A1* | 11/2011 | Nakazaki | H01B 7/0892 361/827 |

* cited by examiner

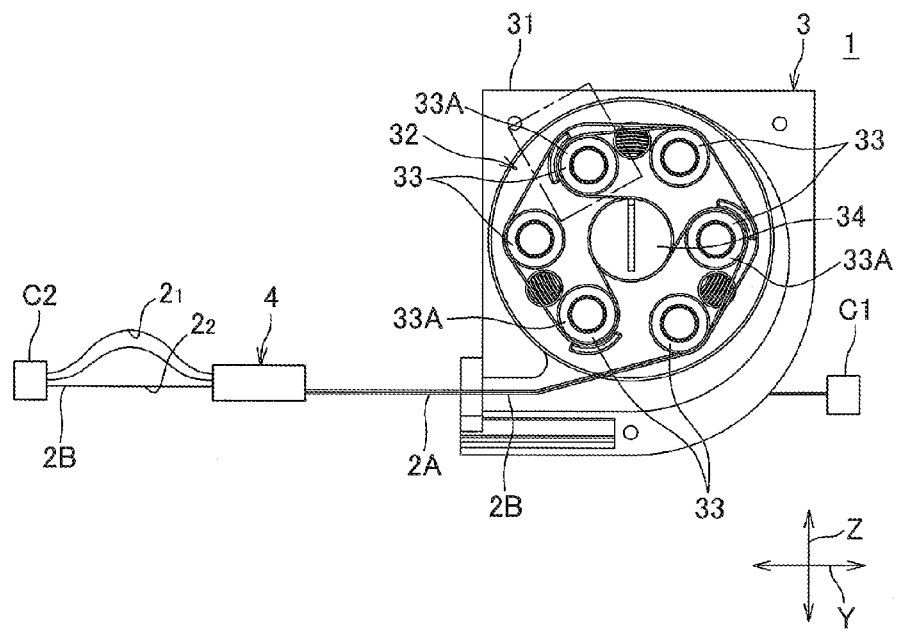
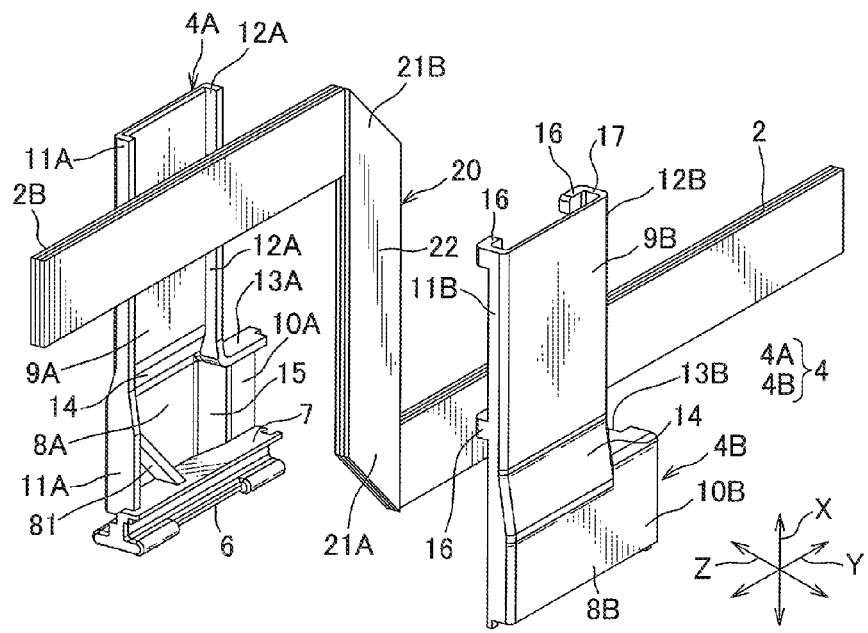

FLAT CABLE ROUTING STRUCTURE

TECHNICAL FIELD

The present invention relates to a flat cable routing structure for feeding electric power to a slide body installed on a vehicle floor.

BACKGROUND ART

For example, a slide seat, a slide door, and the like provided slidably on a vehicle are used in an automobile or the like. The slide seat is provided with electronic devices such as a seating sensor for detecting whether a crew is seated or not, and a seat belt sensor for detecting whether a crew is wearing a seat belt or not. The slide door is provided with electronic devices such as a driving motor for opening and closing a door window, and a door courtesy lamp for illuminating crew's feet when a door is open. Therefore, in a vehicle provided with slide bodies such as the slide seat and the slide door, for connecting electronic devices provided on the slide bodies with electronic devices such as a controller provided on a vehicle body, various wire routing devices or power feeding devices that rout electric wires between the vehicle body and the slide bodies are used.

In such a wire routing device, since a slackness portion is formed in the electric wire (for example, referred to as a flat cable or a flat harness) connecting the electronic devices at the slide body side with the electronic devices at the vehicle body side in association with a sliding movement of the slide body, a winding device for winding this slackness portion of the electric wire to prevent the electric wire from interfering with the slide body or the like (for example, refer to PTL 1) is used. As shown in FIG. 7A, a conventional winding device 101 described in PTL 1 is a device capable of winding one side end portion of a flat cable 102 and to let the flat cable 102 feed out the other side end portion thereof. The conventional winding device 101 includes: a case 130 substantially cylindrically shaped as a whole; an inner annular wall 131 provided within the case 130 and holding the one side end portion of the flat cable 102; a rotor 104 provided rotatively and guided by the inner annular wall 131; a coil spring biasing this rotor 104 in a winding direction R of the flat cable 102; and a plurality of rollers 106 provided along a circumferential direction of the inner annular wall 131.

This winding device 101 is configured such that the one side end portion of the flat cable 102 guided into the case 130 is inverted by one roller 106A of the plurality of rollers 106 to be held within the inner annular wall 131, while the other side end portion of the flat cable 102 is led out from the case 130. Further, the winding device 101 is configured such that the rotor 104 is rotated with the biasing force of the coil spring in the winding direction R to wind the flat cable 102 around a periphery of the inner annular wall 131 and to wind the flat cable 102 around outer peripheries of the plurality of rollers 106, thereby the flat cable 102 is wound up. By contrast thereto, in a case where the other side end portion of the flat cable 102 is pulled in association with the sliding movement of the slide body, the rotor 104 is rotated in a direction opposite to the winding direction R, thereby, the wrappings of the flat cable 102 wound around the periphery of the inner annular wall 131 and the outer peripheries of the plurality of rollers 106 are released, and the flat cable 102 is fed out of the case 130.

CITATION LIST

Patent Literature

[PTL 1]
JP 2004-328985A

SUMMARY OF INVENTION

Technical Problem

However, in the conventional winding device 101 described above, because the flat cable is wound along the plurality of rollers 106, for example, in three stacked flat cables $102_1$, $102_2$, and $102_3$ interposed between the rollers 106, as shown in FIG. 7B, the inner flat cable $102_1$ may be wound straight, and the outer flat cable $102_3$ may be wound slackly. Therefore, a length difference may be generated between the inner flat cable $102_1$ and the outer flat cable $102_3$ in a circumferential direction of the rotor 104, and due to such an inner/outer circumference lengths difference (difference between a length of an inner circumference and a length of an outer circumference), the other side end portion of the wound part of the inner flat cable $102_1$ is easily slacked. When slackness is made at the other side end portion of the inner flat cable $102_1$, this slack portion 102A is possibly involved into the winding device 101, and thereby the winding device 101 may be caused to malfunction. Further, an interference between this slackness and the other components may cause the flat cable 102 to be damaged or disconnected.

An object of the present invention is to provide a flat cable routing structure for preventing flat cables from suffering damage or disconnection, and for minimizing winding device's malfunction, even when the flat cables are used in a plurally stacked state.

Solution to Problem

According to one aspect of the present invention, there is provided a flat cable routing structure for feeding electric power to a slide body mounted on a vehicle floor comprising:

a winding device installed in a vicinity of the slide body to wind up one side end portion of plurally stacked flat cables and to feed out the other side end portion of the flat cables; and a protector guided in a slide direction of the slide body between a distal position distant from the winding device at which the flat cables are fed out and a proximal position near the winding device at which the flat cables are wound up, wherein the protector is provided with a slackness absorption part for absorbing, within its interior, a slack portion consisted of an inner/outer circumference lengths difference between an outer flat cable and an inner flat cable with respect to a stack direction of the flat cables produced when the flat cables are wound up by the winding device in association with a sliding movement of the protector from the distal position to the proximal position.

According to a first preferred aspect of the present invention, there is provided the flat cable routing structure according to the one aspect of the present invention, wherein each of the flat cables includes an orthogonal part orthogonal to a longitudinal direction of the flat cables, the orthogonal part formed by being folded up in a width direction of the flat cables at two points spaced in the longitudinal direction, wherein the slackness absorption part is formed in a tubular shape, and receives the orthogonal part thereinside, and a size of the slack absorption part in the slide direction is formed larger than a size obtained by adding the inner/outer circumference lengths difference to a width size of the flat cable, and wherein in a state where the protector is positioned at the proximal position, within an inside of the slackness absorption part, the inner flat cable is provided at the distal position side by the inner/outer circumference lengths difference closer than the outer flat cable.

According to a second preferred aspect of the present invention, there is provided the flat cable routing structure as described in the second aspect, wherein a stack part stacked by folding up the flat cables is formed on both ends of the orthogonal part, wherein the slack absorption part is provided with a stack receiver receiving the stack part, and an intermediate receiver receiving an intermediate part of the orthogonal part other than the stack part, and wherein a size of the intermediate receiver in the stack direction of the flat cables is smaller than a size of the stack receiver in the stack direction.

Advantageous Effects of Invention

According to the invention as described in the first aspect, the slack absorption part is provided for absorbing, in its interior, a slack portion caused by inner/outer circumference lengths difference between an outer flat cable and an inner flat cable with respect to a stack direction of the flat cables when the flat cables are wound up by the winding device in association with the sliding movement of the protector from the distal position to the proximal position. Therefore, the slack absorption part absorbs the slack portion and thereby the slack portion is not generated at the winding device side nearer than the protector. Therefore, the winding device is prevented from malfunctioning and the slack portion is prevented from interfering with other components caused by involving the slack portion into the winding device, and the flat cables are prevented from being suffered damage and disconnected.

According to the invention as described in the first preferred aspect, each of the flat cables includes an orthogonal part orthogonal to a longitudinal direction of the flat cables, the orthogonal part being formed by folding in a width direction of the flat cables at two points separated in the longitudinal direction, the slackness absorption part is formed in a tubular shape, and receives the orthogonal part thereinside, and a size of the slack absorption part in the slide direction is formed larger than additional size of the inner/outer circumference lengths difference to a width size of the flat cable. Therefore, when the protector is moved from the distal position to the proximal position, a force opposite to a force to move the protector to the distal position to the proximal position (a force from the proximal position to the distal position) is applied to the orthogonal part, and in an interior of the slack absorption part, the inner flat cable is moved toward the distal position side the inner/outer circumference lengths difference nearer than the outer flat cable, thereby a structure in which the slack absorption part, in its interior, absorbs the slack portion is enabled.

According to the invention as described in the second preferred aspect, a stack part stacked by folding the flat cables is formed on both ends of the orthogonal part, the slack absorption part is provided with a stack receiver receiving the stack part, and an intermediate receiver receiving an intermediate part of the orthogonal part other than the stack part, and a size of the intermediate receiver in the stack direction of the flat cables is smaller than a size of the stack receiver in the stack direction. Therefore, in an interior of the protector, movement of the intermediate part of the orthogonal part other than the stack part in the stack direction is limited, and the intermediate part is prevented from thrashing in the stack direction and twisting.

BRIEF DESCRIPTION OF DRAWINGS

FIG. 2 is a plan view of the flat cable routing structure shown in FIG. 1.

FIG. 3 is an exploded perspective view of the protector as a component of the flat cable routing structure shown in FIG. 1.

DESCRIPTION OF EMBODIMENTS

Figure 1A:
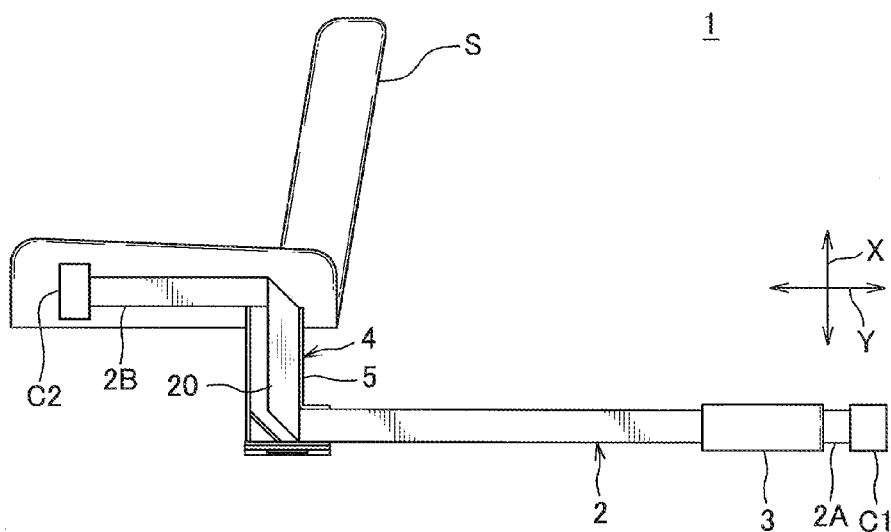
FIG. 1A is a side view showing an embodiment of a flat cable routing structure according to the present invention, and showing a state where a protector is positioned at a distal position.
Figure 1B:
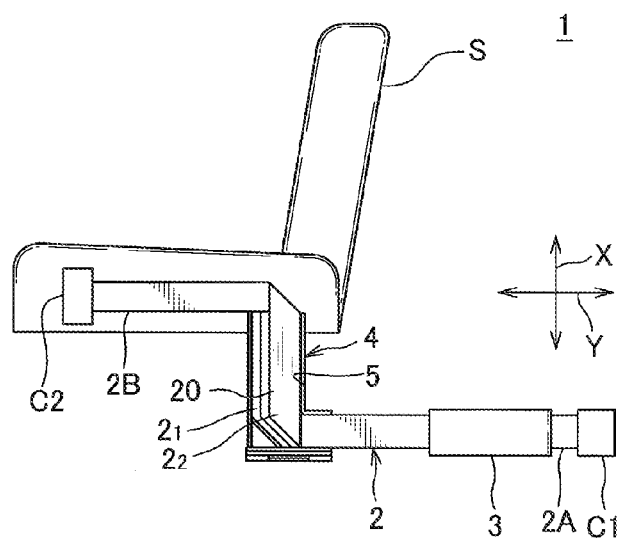
FIG. 1B is a side view showing the embodiment of the flat cable routing structure according to the present invention, and showing a state where the protector is positioned at a proximal position.

Hereinafter, an exemplary embodiment of a flat cable routing structure 1 according to the present invention will be described with reference to FIGS. 1 to 6. The flat cable routing structure 1 is a structure for feeding electric power to electronic devices mounted on a slide body S such as a slide seat or a slide door slidably provided in a back and forth direction of a vehicle or the like. As shown in FIGS. 1A, 1B, and 2, this flat cable routing structure 1 includes: a winding device 3 installed near a slide rail slidably supporting the slide body for winding up one side end portion 2A of plurally stacked flat cables 2 (three cables in this embodiment) and feeding out the other side end portion 2B of the flat cables 2; and a protector 4 guided in a slide direction (arrow Y direction) of the slide body S between a distal position (shown in FIG. 1A) distant from the winding device 3 at which the flat cables 2 are fed out, and a proximal position (shown in FIG. 1B) near the winding device 3 at which the flat cables 2 are wound up. The slide rail is extended in the back and forth direction of the vehicle, and the slide body S is set so as to slide in the back and forth direction of the vehicle.

The flat cable 2 is formed longer enough than a slide distance of the slide seat S. The one side end portion 2A is passed through an interior of the winding device 3, then extracted outside, and connected to a connector C1 at a floor side. The other side end portion 2B is connected to a connector C2 at a slide seat S side via the protector 4.

The flat cable 2 includes: a flat plate shaped conductor having a flat section; and an insulating cover covering this conductor, and is formed in a thin band plate shape having flexibility. The cover is made of synthetic resin. As shown in FIG. 3, this flat cable 2 is formed in a crank shape having a orthogonal part 20 (intersection part) orthogonal to a longitudinal direction of the flat cable 2 made by folding the flat cable 2 in a width direction of the flat cable 2 at two positions spaced in the longitudinal direction. This orthogonal part 20 is housed in an interior of the protector 4 so that both ends in a longitudinal direction of the orthogonal part 20 are oriented in a vertical direction (arrow X direction) and movable in the slide direction (arrow Y direction).

As shown in FIG. 3, the orthogonal part 20 is formed in a parallelogram shape and includes: triangular parts 21A, 21B (stack parts) positioned at both ends in the vertical direction (arrow X direction) and formed by folding the flat cable 2; and a rectangular part 22 (intermediate part) positioned in the middle of the orthogonal part 20, namely, interposed between the triangular parts 21A, 21B. Each of the triangular parts 21A, 21B is formed in an isosceles right triangle shape in a plan view, two sides having the same lengths are respectively provided along the vertical direction (arrow X direction) and the back and forth direction (arrow Y direction), and the base is inclined at 45 degrees to an upper face of a bottom wall 7 of the protector 4. Because three stacked flat cables 2 are used, the triangular parts 21A, 21B have a thickness of six flat cables, and each of the rectangular part 22, the one end 2A side of the triangular part 21A, and the other end 2B side of the triangular part 21B has a thickness of three flat cables. Among these three stacked flat cables 2, an inner flat cable 2₁ is provided at a side proximal to the slide seat S (back side in a direction orthogonal to a paper sheet in FIG. 1B), and an outer flat cable 2₂ is provided at a side distal to the slide seat S (front side in the direction orthogonal to the paper sheet in FIG. 1B).

The winding device 3 is, for example, a device for winding up the flat cables 2 routed between the slide seat (slide body S) slidably provided on a floor of a vehicle or the like and the vehicle, and used for preventing the flat cables 2 from interfering with the slide body S or the like by winding up the flat cables 2 in association with an approaching movement of the protector 4, and by feeding out the flat cables 2 in association with a separating movement of the protector 4, and thereby winding up the slack portion of the flat cables 2 in association with a sliding movement of the slide body S.

As shown in FIG. 2, the winding device 3 includes: a case 31 for housing the wound up flat cables 2; a rotary table 32 provided rotatively in an interior of the case 31; a plurality of rollers 33 (six in this embodiment) rotatively supported on the rotary table 32; and a coil spring (not shown) biasing the rotary table 32 in a winding direction of the flat cable 2. A center shaft 34 is provided vertically in a substantially center of the case 31 for rotatively supporting the rotary table 32.

In such a winding device 3, the one side end portion 2A of the flat cables 2 is wound around a periphery of the center shaft 34, inverted by an inversion roller 33A, and guided out of the case 31. Then, owing to restoring force of the coil spring, when the rotary table 32 is rotated in the winding direction, the flat cables 2 are wound up to an outer periphery of the center shaft 34 and outer peripheries of the plurality of rollers 33 in the rotary table 32. From this winding up state, the flat cables 2 are guided out, and when the flat cables 2 are sent from the outer periphery of the center shaft 34 to the outer peripheries of the plurality of rollers 33, the flat cables 2 are fed out of the case 31 sequentially.

Here, the slide direction of the slide seat S is indicated by the arrow Y, a vertically providing direction of the center shaft 43 is indicated by the arrow X, and a direction perpendicular to both the arrow Y and the arrow X is indicated by an arrow Z. Further, the arrow Y direction is the back and forth direction of a vehicle, the arrow X direction is the vertical direction of a vehicle, and the arrow Z direction is a stack direction of the flat cables 2.

Figure 4:
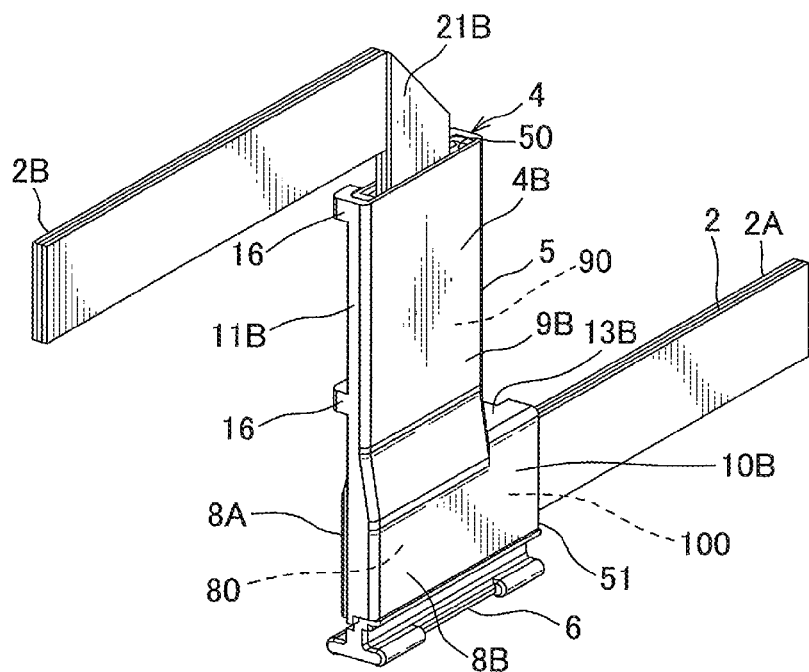
FIG. 4 is a perspective view showing a state where a flat cable is housed in an interior of the protector shown in FIG. 3.

As shown in FIG. 4, the protector 4 includes: an L-shaped orthogonal receiver 5 (slackness absorption part) having a first outlet 50 opening upward and guiding out the other side end portion 2B of the flat cables 2, and a second outlet 51 opening backward and guiding out the one side end portion 2A of the flat cables 2 and housing the orthogonal part 20; and a slide part 6 provided continuously at a bottom side of the orthogonal receiver 5 and sliding on a groove extended in the back and forth direction of the floor.

As shown in FIG. 3, this orthogonal receiver 5 (protector 4) is composed of an L-shaped protector main body 4A, and an L-shaped cover 4B for holding the orthogonal part 20 in between the protector main body 4A and the cover 4B. The protector main body 4A is provided integrally with the slide part 6. The cover 4B is provided integrally with an L-shaped locking claw 16 to lock with the protector main body 4A. The cover 4B is slid downward while the locking claw 16 is locked with the protector main body 4A so that the cover 4B is assembled to the protector main body.

As shown in FIG. 3, the orthogonal receiver 5 includes: a rectangular plate shaped bottom wall 7 provided facing the floor and a longitudinal direction thereof being provided along the back and forth direction of a vehicle; a pair of first walls 8A, 8B extended vertically from the bottom wall 7 and facing each other; a pair of second walls 9A, 9B respectively continuing upward from the pair of first walls 8A, 8B; a pair of third walls 10A, 10B respectively continuing backward from the pair of first walls 8A, 8B; a pair of first sidewalls 11A, 11B respectively continuing from front edges of the first walls 8A, 8B and the second walls 9A, 9B and stacked on each other; a pair of second sidewalls 12A, 12B respectively continuing from rear edges of the second walls 9A, 9B and stacked on each other; and the third sidewalls 13A, 13B respectively continuing from upper edges of the third walls 10A, 10B and stacked on each other. Among the pair of first walls 8A, 8B, one first wall 8A is provided at an inside (near side to the slide seat S in FIG. 1) in the stack direction (arrow Z direction), and the other first wall 8B is provided at an outside (far side from the slide seat S in FIG. 1) in the stack direction.

As shown in FIG. 4, the pair of first walls 8A, 8B has a first receiver 80 (stack receiver) housing the triangular part 21A at a lower side of the orthogonal part 20 in a space between the pair of first walls 8A, 8B. The pair of first walls 8A, 8B is provided with a gap slightly larger than a thickness of the triangular part 21A (in this embodiment, thickness of six flat cables). As shown in FIG. 3, an inner wall 81 formed obliquely to an upper face of the bottom wall 7 is provided in between the pair of first walls 8A, 8B so as to abut on a base of the triangular part 21A. One end of the inner wall 81 is provided continuing to the bottom wall 7, and the other end of the inner wall 81 is provided continuing to the first sidewall 11A.

As shown in FIGS. 3 and 4, the pair of second walls 9A, 9B is provided with a second receiver 90 (intermediate receiver) housing a rectangular part 22 of the orthogonal part 20 in a space between the pair of second walls 9A, 9B. The pair of second walls 9A, 9B is provided with a gap slightly larger than a thickness of the rectangular part 22 (thickness of three flat cables in this embodiment). A size between the pair of second walls 9A, 9B in the stack direction (arrow Z direction) is formed smaller than a size between the first walls 8A, 8B in the stack direction. A size of the second wall 9A in the slide direction (arrow Y direction) (a size between the first sidewall 11A and the second sidewall 12A) is formed smaller than a size of the second wall 9B in the slide direction (a size between the first sidewall 11B and the second sidewall 12B), so that when the cover 4A is assembled with the protector main body 4A, the sidewalls 11A, 12A are respectively stacked with interiors of the sidewalls 11B, 12B.

As shown in FIGS. 3 and 4, the pair of third walls 10A, 10B is provided with a third receiver 100 housing a rear side of the triangular part 21A, 21B in a space between the pair of third walls 10A, 10B. The pair of third walls 10A, 10B is provided with a gap slightly larger than a thickness of three flat cables. Further, a size of the pair of third walls 10A, 10B in the stack direction (arrow Z direction) is formed substantially equal to a size of the pair of second walls 9A, 9B in the stack direction.

Further, as shown in FIG. 3, a pair of first inclined parts 14 inclined toward an inside (toward an inside of the orthogonal receiver 5) as extended upward is provided in between the pair of first walls 8A, 8B and the pair of second walls 9A, 9B. Further, a pair of second inclined parts 15 inclined toward an inside (toward an inside of the orthogonal receiver 5) as extended backward is provided in between the pair of first walls 8A, 8B and the pair of third walls 10A, 10B.

Figure 5:
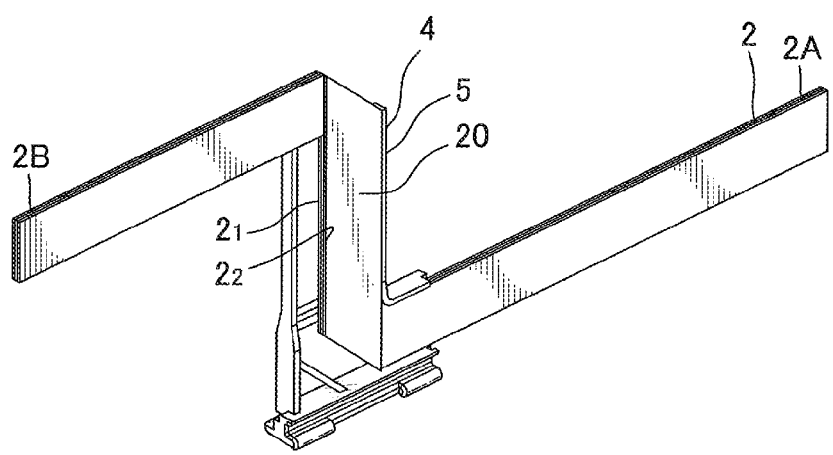
FIG. 5 is a perspective view showing a state of the flat cable in the interior of the protector shown in FIG. 2 when the protector is positioned at the distal position.
Figure 6A:
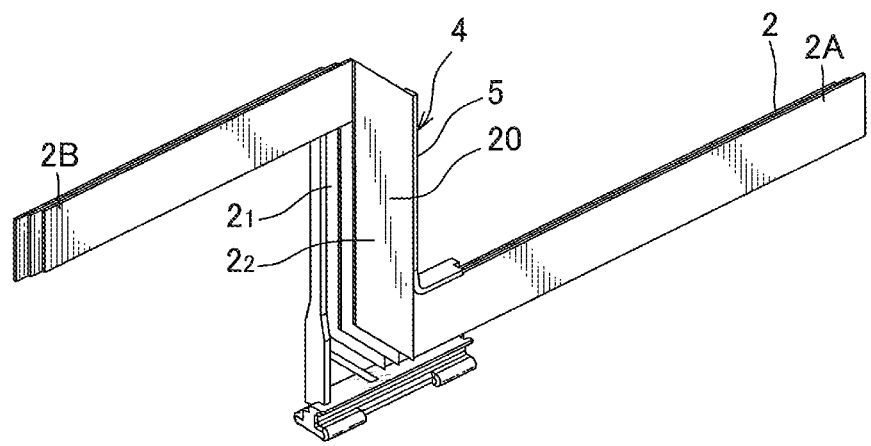
FIG. 6A is a perspective view showing a state of the flat cable in the interior of the protector when the protector is positioned at the proximal position.
Figure 6B:
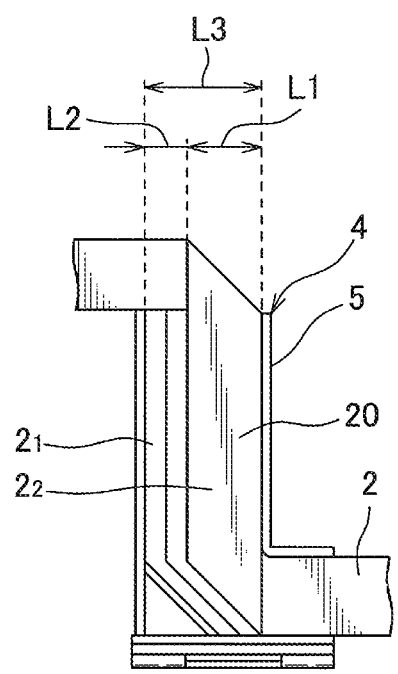
FIG. 6B is a plan view of FIG. 6A.
Figure 7A:
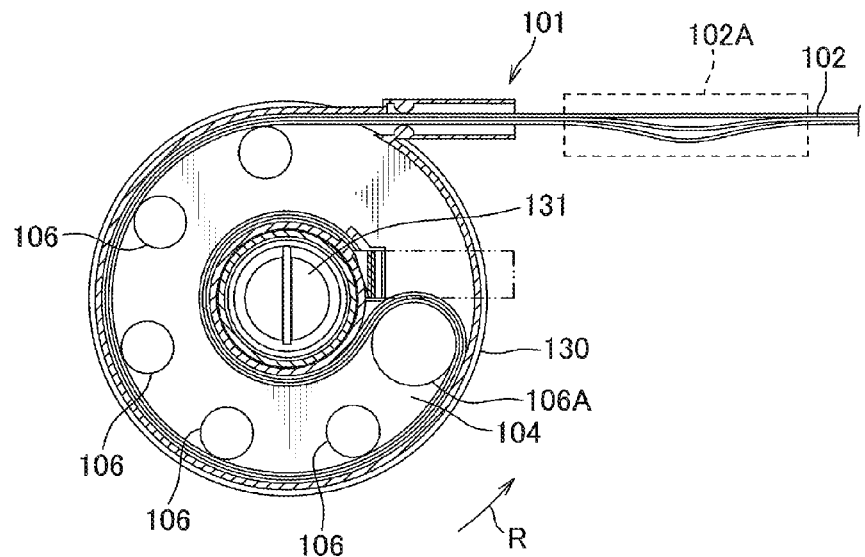
FIG. 7A is a plan view showing a conventional winding device described in PTL 1.
Figure 7B:
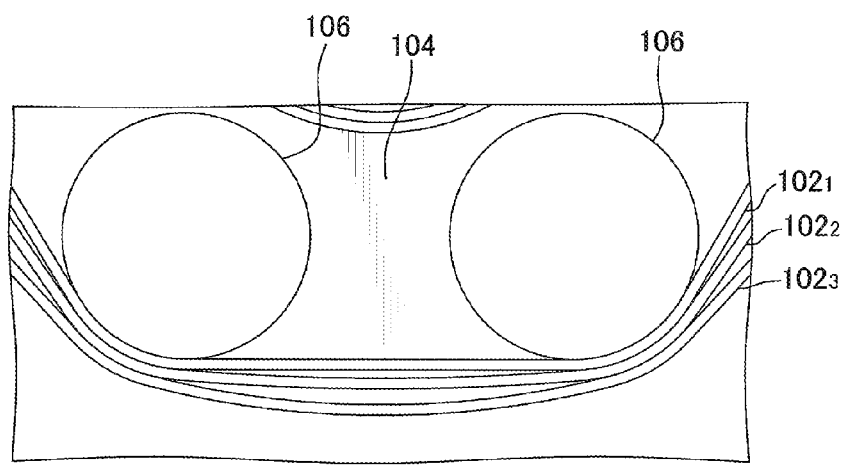
FIG. 7B is a partially enlarged view of FIG. 7A.

As shown in FIG. 6B, the orthogonal receiver 5 is formed such that a size L3 of the second wall 9A in the slide direction (arrow Y direction) (a size of the slack absorption part in the slide direction in claims) is slightly greater than a size obtained by adding the inner/outer circumference lengths difference L2 between the outer flat cable 22 and the inner flat cable 21 which is made when the winding device 3 is winding up the flat cables 2 to a width size L1 of the flat cable 2. In this way, since the minimum inner width L3 of the orthogonal receiver 5 in the slide direction (arrow Y direction) is formed slightly greater than the size obtained by adding the inner/outer circumference lengths difference L2 to the width size L1 of the flat cable 2, as shown in FIG. 5, when the protector 4 is positioned at the distal position, all of the three flat cables 2 are provided at the proximal position in the interior of the orthogonal receiver 5, and in association with the sliding movement of the protector 4 from the distal position to the proximal position, a force that opposes to a force to move the protector 4 from the distal position to the proximal position (force from the proximal position to the distal position) is applied to the orthogonal part 20 so that as shown in FIG. 6B, the inner flat cable 21 is relatively moved at the distal position side which is by the inner/outer circumference lengths difference L2 closer than the outer flat cable 22. Here, in this specification, the phrase "absorbing, in its interior, a slack portion caused by the inner/outer circumference lengths difference between an outer flat cable and an inner flat cable" means that in the interior of the orthogonal receiver 5, the inner flat cable 21 is relatively moved at the distal position side by the inner/outer circumference lengths difference L2 closer than the outer flat cable 22.

Next, an assembling procedure of the flat cable routing structure 1 will be described. First, the one side end portions 2A of the flat cables 2 are previously routed in the winding device 3. The other ends 2B of the flat cables 2 are folded in the width direction of the flat cables 2 so as to form the lower triangular part 21A and the rectangular part 22 and to accommodate them within an interior of the protector main body 4A. In this state, since the other ends of the flat cables 2 are extended upward, the other side end portions 2B of the flat cables 2 are accommodated within an inside of the L-shaped locking claw 16 of the cover 4B, and the cover 4B is slid with respect to the protector main body 4A. The locking claw 16 is locked with the second wall 9A of the protector main body 4A, and the cover 4B is assembled with the protector main body 4A. The triangular part 21A is accommodated within the first receiver 80, and the rectangular part 22 is accommodated within the second receiver 90. In this way, the protector 4 is assembled. Then, the flat cables 2 guided out from the first outlet 50 is folded to form the upper triangular part 21B, and the other side end portions 2B of the flat cables 2 are connected to the connector C2 of the slide seat S. In final, the one side end portions 2A of the flat cables 2 guided out from the second outlet 51 are connected to the connector C1 at the floor. In this way, the flat cable routing structure 1 is made assembled.

In such a flat cable routing structure 1, when the protector 4 is moved from the distal position to the proximal position, a force opposite to a force to move the protector 4 from the distal position to the proximal position (a force from the proximal position to the distal position) is applied to the orthogonal part 20, and the inner flat cable 21 is moved at the distal position side the inner/outer circumference lengths difference L2 nearer than the outer flat cable 22, thereby a structure for absorbing the slack portion within an interior of the orthogonal receiver 5 is enabled.

Incidentally, in this embodiment, although three stacked flat cables 2 as the plurally stacked flat cables 2 are exemplified to be explained, the present invention is not limited thereto. The flat cables 2 may be more than two stacked cables. Further, although the flat cable 2 includes a flat plate shaped conductor, the present invention is not limited thereto. The conductor may be composed of a plurality of core wires parallel to each other, and the core wire may be composed of a single wire. Further, although the orthogonal part 20 of the flat cable 2 is provided orthogonal to the longitudinal direction of the flat cable 2, the present invention is not limited thereto, and the orthogonal part 20 may intersect with the longitudinal direction of the flat cable 2, and insofar as the orthogonal receiver 5 (slackness absorption part) can absorb the slack portion within its interior, the orthogonal receiver 5 may not be in a crank shape. The shape of the flat cable 2 is arbitrary defined.

Incidentally, the above embodiments only show typical embodiments of the present invention, and the present invention is not limited to these embodiments. Namely, various modifications can be carried out within the scope of the present invention

[Reference Signs List]

1 flat cable routing structure
2 flat cable
$2_1$ inner flat cable

-continued

[Reference Signs List]

2₂ outer flat cable
3 winding device
4 protector
5 orthogonal receiver (slackness absorption part)
20 orthogonal part (intersection part)
21A triangular part (stack part)
22 rectangular part (intermediate part)
80 first receiver (stack receiver)
90 second receiver (intermediate receiver)

The invention claimed is:

1. A flat cable routing structure for feeding electric power to a slide body mounted on a vehicle floor comprising:
a winding device installed in a vicinity of the slide body to wind up one side end portion of plurally stacked flat cables and to feed out the other side end portion of the flat cables; and
a protector guided in a slide direction of the slide body between a distal position distant from the winding device at which the flat cables are fed out and a proximal position near the winding device at which the flat cables are wound up,
wherein the protector is provided with a slackness absorption part for absorbing, within its interior, a slack portion consisted of an inner/outer circumference lengths difference between an outer flat cable and an inner flat cable with respect to a stack direction of the flat cables produced when the flat cables are wound up by the winding device in association with a sliding movement of the protector from the distal position to the proximal position.

2. The flat cable routing structure as claimed in claim 1, wherein each of the flat cables includes an orthogonal part orthogonal to a longitudinal direction of the flat cables, the orthogonal part formed by being folded up in a width direction of the flat cables at two points spaced in the longitudinal direction,
wherein the slackness absorption part is formed in a tubular shape, and receives the orthogonal part thereinside, and a size of the slack absorption part in the slide direction is formed larger than a size obtained by adding the inner/outer circumference lengths difference to a width size of the flat cable, and
wherein in a state where the protector is positioned at the proximal position, within an inside of the slackness absorption part, the inner flat cable is provided at the distal position side by the inner/outer circumference lengths difference closer than the outer flat cable.

3. The flat cable routing structure as claimed in claim 2, wherein a stack part stacked by folding up the flat cables is formed on both ends of the orthogonal part,
wherein the slack absorption part is provided with a stack receiver receiving the stack part, and an intermediate receiver receiving an intermediate part of the orthogonal part other than the stack part, and
wherein a size of the intermediate receiver in the stack direction of the flat cables is smaller than a size of the stack receiver in the stack direction.

* * * * *